United States Patent
Stählin

(10) Patent No.: US 10,843,685 B2
(45) Date of Patent: Nov. 24, 2020

(54) METHOD AND SYSTEM FOR PREVENTING A FOLLOWING VEHICLE FROM DRIVING UP ON A VEHICLE DRIVING DIRECTLY IN FRONT AND USE OF THE SYSTEM

(71) Applicant: Continental Teves AG & Co. oHG, Frankfurt (DE)

(72) Inventor: Ulrich Stählin, Eschborn (DE)

(73) Assignee: Continental Teves AG & Co. oHG (DE)

( * ) Notice: Subject to any disclaimer, the term of this patent is extended or adjusted under 35 U.S.C. 154(b) by 518 days.

(21) Appl. No.: 14/781,697

(22) PCT Filed: Apr. 17, 2014

(86) PCT No.: PCT/EP2014/057890
§ 371 (c)(1),
(2) Date: Oct. 1, 2015

(87) PCT Pub. No.: WO2014/170432
PCT Pub. Date: Oct. 23, 2014

(65) Prior Publication Data
US 2016/0039412 A1 Feb. 11, 2016

(30) Foreign Application Priority Data
Apr. 19, 2013 (DE) .................. 10 2013 207 113

(51) Int. Cl.
*B60W 30/09* (2012.01)
*G08G 1/16* (2006.01)
(Continued)

(52) U.S. Cl.
CPC ............... *B60W 30/09* (2013.01); *B60T 8/17* (2013.01); *B62D 6/001* (2013.01); *G08G 1/163* (2013.01)

(58) Field of Classification Search
CPC ........... B60W 30/09; G08G 1/163; B60T 8/17
(Continued)

(56) References Cited

U.S. PATENT DOCUMENTS 6,268,804 B1 * 7/2001 Janky .................... G01S 5/0072
 180/169
7,668,633 B2   2/2010 Diebold
(Continued)

FOREIGN PATENT DOCUMENTS

DE   102008009900   12/2010
DE   102011077997   1/2012
(Continued)

OTHER PUBLICATIONS

"Car 2 Car Communication Consortium Manifesto; Overview of the C2C-CC System; Version 1.1," Aug. 28, 2007, pp. 1-94.
(Continued)

*Primary Examiner* — Charles A Fox
*Assistant Examiner* — Michael E Butler
(74) *Attorney, Agent, or Firm* — RatnerPrestia

(57) ABSTRACT

A method and system for preventing a following vehicle from driving up on a vehicle driving directly in front. The following vehicle detects a behavior of the vehicle driving directly in front by sensor information and a behavior of at least one vehicle driving in front by vehicle-to-X information. The vehicle-to-x information requests an intervention in the steering of the following vehicle by a steering angle to be set and/or an intervention in the braking of the following vehicle by a deceleration to be set in order to prevent driving up on the vehicle, and wherein the steering angle and/or the deceleration requested by the vehicle-to-X information is greater than a steering angle and/or a requested deceleration requested by the sensor information and/or driver inputs. The intervention is only carried out if
(Continued)

the steering angle and/or the deceleration is confirmed by sensor information and/or driver inputs.

15 Claims, 2 Drawing Sheets

(51) Int. Cl.
    *B60T 8/17*          (2006.01)
    *B62D 6/00*        (2006.01)

(58) Field of Classification Search
    USPC .......................................................... 701/41
    See application file for complete search history.

(56) References Cited

U.S. PATENT DOCUMENTS

| | | | |
|---|---|---|---|
| 8,483,928 B2 | 7/2013 | Shida | |
| 9,096,228 B2 | 8/2015 | Stahlin | |
| 2004/0215385 A1* | 10/2004 | Aizawa | B60K 31/00 701/93 |
| 2007/0185639 A1* | 8/2007 | Osborn | B60T 7/22 701/71 |
| 2010/0114490 A1* | 5/2010 | Becker | B60W 30/16 701/301 |
| 2011/0054716 A1* | 3/2011 | Stahlin | G01C 21/28 701/1 |
| 2011/0166974 A1* | 7/2011 | Cohen | G06Q 30/04 705/34 |
| 2012/0078466 A1* | 3/2012 | Natori | B60T 7/22 701/36 |
| 2012/0197507 A1* | 8/2012 | Custer | B60K 31/0008 701/96 |
| 2013/0158821 A1* | 6/2013 | Ricci | G06F 9/54 701/51 |
| 2013/0158852 A1* | 6/2013 | Stahlin | G06K 9/6289 701/301 |
| 2013/0253792 A1* | 9/2013 | Hammoud | B60T 7/22 701/70 |
| 2014/0039786 A1* | 2/2014 | Schleicher | B60W 30/09 701/301 |
| 2014/0070980 A1* | 3/2014 | Park | G01S 19/42 342/118 |
| 2014/0129060 A1* | 5/2014 | Cooper | B61L 15/0027 701/19 |
| 2014/0316671 A1* | 10/2014 | Okamoto | G08G 1/22 701/96 |
| 2015/0012204 A1* | 1/2015 | Breuer | B60T 7/22 701/96 |
| 2015/0042151 A1* | 2/2015 | Zimmermann | B60T 8/1755 303/3 |
| 2015/0120160 A1* | 4/2015 | Foltin | B60W 30/0956 701/70 |
| 2016/0001775 A1* | 1/2016 | Wilhelm | B60W 30/085 701/25 |
| 2016/0046266 A1* | 2/2016 | Hammoud | G05D 1/0088 701/70 |

FOREIGN PATENT DOCUMENTS

| | | |
|---|---|---|
| EP | 1610992 | 5/2011 |
| JP | 1047975 A | 2/1998 |
| JP | 2001199257 A | 7/2001 |
| WO | 2004085220 | 10/2004 |
| WO | 2009071345 | 6/2009 |
| WO | 2010100725 A1 | 9/2010 |

OTHER PUBLICATIONS

German Search Report for German Application No. 10 2013 207 113.2 dated Sep. 13, 2013, including partial translation.
International Search Report for International Application No. PCT/EP2014/057890 dated Aug. 13, 2014.
Yan, G, et al., "Providing VANET security through active positive detection," Computer Communications, 2008, pp. 1-15.
European Examination Report for European Application No. 14 721 791.3, dated Oct. 24, 2019, 5 pages.
Notice of Reasons for Refusal for Japanese Application No. 2016-508174, dated Oct. 24, 2016, with translation, 6 pages.

* cited by examiner

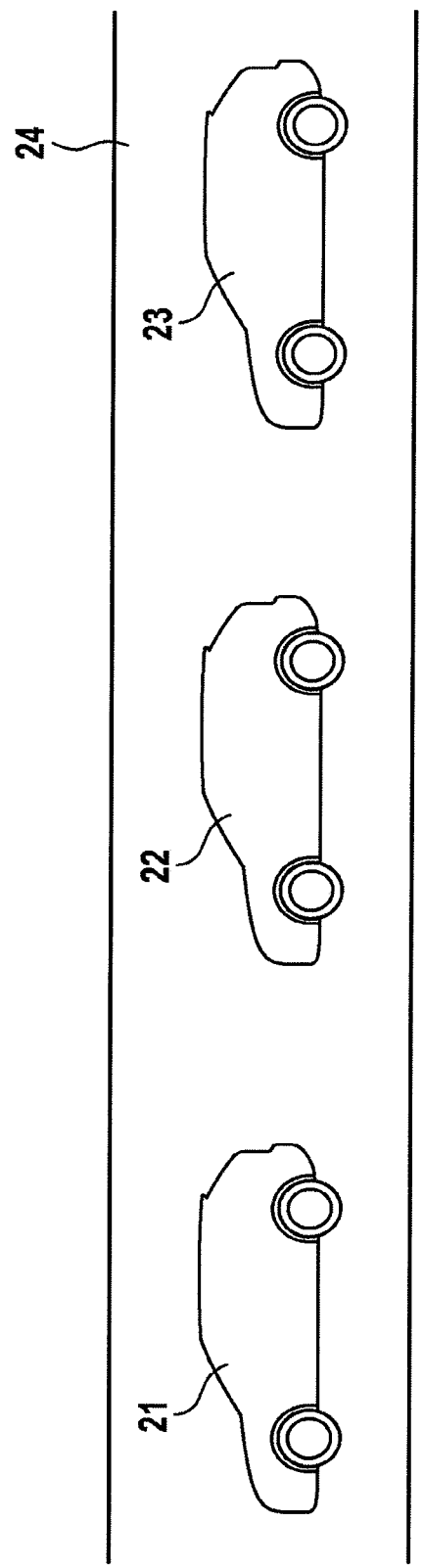

METHOD AND SYSTEM FOR PREVENTING A FOLLOWING VEHICLE FROM DRIVING UP ON A VEHICLE DRIVING DIRECTLY IN FRONT AND USE OF THE SYSTEM

CROSS REFERENCE TO RELATED APPLICATIONS

This application is the U.S. National Phase Application of PCT/EP2014/057890, filed Apr. 17, 2014, which claims priority to German Patent Application 10 2013 007 113.2, filed Apr. 19, 2013, the contents of such applications being incorporated by reference herein.

FIELD OF THE INVENTION

The invention relates to a method for preventing a following vehicle from driving up on a vehicle driving directly in front, a system for preventing a following vehicle from driving up on a vehicle driving directly in front and use thereof.

BACKGROUND OF THE INVENTION

In the motor vehicle industry, a multiplicity of different environment sensor systems that are suitable for detecting different types of environment information already belong to the prior art. Examples of sensor systems of this type include camera systems, radar systems, lidar systems or ultrasound systems. Similarly, it is already known not only to receive but also to transmit information relating to the vehicle environment by means of wirelessly communicating communication systems. The information obtained both by means of wireless communication and by means of environment sensors can be used to improve driving comfort and vehicle safety. Particularly with regard to vehicle safety, information of this type is used not only to warn the driver but also, with certain prerequisites and with adequate reliability, also for autonomous interventions in a vehicle steering or braking device.

In this connection, WO 2004/085220 A1, which is incorporated by reference, discloses an electronic control system for a vehicle and a method for determining an intervention in a vehicle system that is independent from the driver. A driver request module initially determines a driver request from the pedal travel, from transfer movements between the pedals and from the braking pressure in the braking system. A risk calculator then determines the existing risk potential by means of an evaluation of the driver request and an evaluation of further data such as e.g. environment sensor data. Furthermore, the electronic control system is connected to different, autonomously operating assistance systems. The driver request data and the environment data are evaluated by the risk calculator and corresponding request commands are output to the individual assistance systems. The request commands relate to both passive and active safety devices. Depending on the identified potential risk, a vehicle control intervention can thus be performed.

WO 2009 071345 A1, which is incorporated by reference, describes a central control device for a plurality of assistance systems provided in a motor vehicle, of which at least one assistance system is equipped with environment sensors. The central control device connects the individual assistance systems and interlinks the sensor information obtained from the assistance systems in order to analytically check and validate the plausibility of non-redundant sensor information. In addition, for example in the case of a camera, the sensor information can be checked through matching with sensor information from the same sensor recorded at a later time. If the camera therefore detects the same object over a specific time period or over a plurality of measurement cycles, its existence can be regarded as validated. Furthermore, the possibilities are described for validating information received via vehicle-to-X communication by means of an environment sensor or for receiving information of which the plausibility has already been validated by an external transmitter.

A method and a device for controlling a vehicle brake are known from DE 2008 009 900 B4, which is incorporated by reference. Along with the data of a pre-crash sensor system or an optical detection system which monitors the front surrounding area of the vehicle, data of a car-to-car communication system are also processed. From the available data from vehicles which are driving in the same direction as the driver's vehicle, the data which signal the greatest vehicle deceleration are given the highest priority. In particular, the data from a vehicle driving in front of the vehicle driving directly in front are taken into account with a higher priority than the data of the vehicle driving directly in front if the data of the vehicle driving directly in front signal a comparatively lesser deceleration. The driver's own vehicle therefore sets itself according to the greatest deceleration and adapts its braking behavior autonomously to this deceleration.

SUMMARY OF THE INVENTION

However, the disadvantage with the methods, devices and systems known from the prior art is that autonomous interventions in the vehicle control either require a comparatively lengthy validation of the underlying information through sensor measurements independent from one another or vehicle-to-X messages, or are performed without validation, which in turn represents a comparatively high safety risk due to the inevitable occurrence of one-off erroneous measurements and incorrect or even maliciously falsified vehicle-to-X messages.

An aspect of the invention is therefore to overcome the aforementioned disadvantages.

An aspect of the invention relates to a method for preventing a following vehicle from driving up on a vehicle driving directly in front, in which the following vehicle detects a behavior of the vehicle driving directly in front by means of sensor information and a behavior of at least one vehicle driving in front of the vehicle driving in front by means of vehicle-to-X information, wherein the vehicle-to-X information requests an intervention in steering means of the following vehicle in the form of a steering angle to be set and/or an intervention in braking means of the following vehicle in the form of a deceleration to be set in order to prevent the rear-end collision with the vehicle, and wherein the steering angle requested by the vehicle-to-X information and/or the requested deceleration is greater than a steering angle requested by the sensor information and/or driver inputs and or a requested deceleration. The method is characterized in that the intervention with the steering angle requested by the vehicle-to-X information and/or the requested deceleration is performed only if this steering angle and/or this deceleration is/are confirmed by the driver inputs.

This offers the advantage that incorrect or possibly even maliciously falsified vehicle-to-X information cannot result in a safety-critical intervention in the vehicle control, since the steering angle requested by the vehicle-to-X information or the requested deceleration must first be confirmed before the intervention with this steering angle or this intensity is actually performed.

The chosen wording that the vehicle-to-X information and the sensor information request an intervention in steering means or an intervention in the braking means is to be understood according to the invention in such a way that a suitable vehicle system requests an intervention in steering means or an intervention in the braking means on the basis of the evaluation of the vehicle-to-X information or the sensor information.

The intervention can be performed through suitable, driver-independent intervention means.

A situation in which the steering angle requested by the vehicle-to-X information or the requested deceleration is greater than a steering angle requested by the sensor information or driver inputs or a requested deceleration, often occurs when more than two vehicles are driving in a convoy. If two vehicles are driving in front of a following vehicle, i.e. the vehicle directly in front and the vehicle driving in front of the vehicle driving in front, the vehicle driving in front of the vehicle driving in front is often not detectable by the driver of the following vehicle or by the environment sensors of the following vehicle, since it is hidden by the vehicle driving directly in front. However, the vehicle-to-X information transmitted by the vehicle driving in front of the vehicle driving in front remains detectable by the following vehicle. If this vehicle driving in front of the vehicle driving in front then initiates an abrupt braking process with resulting abrupt deceleration and sends this via the function also known as "electronic emergency brake light" in the form of vehicle-to-X information to its environment, it may be that the following vehicle detects this information and an assistance device in the following vehicle recognizes the need for a braking intervention with a steering angle requested by the vehicle-to-X information or a requested deceleration, which is required in order to prevent a rear-end collision with the vehicle driving directly in front. However, since the vehicle driving directly in front itself requires a certain reaction time in order to react to the braking process of the vehicle driving in front with its own braking process, a confirmation of the steering angle requested by the vehicle-to-X information or the requested deceleration is initially not possible.

When vehicles are driving in a convoy, the rear-end collision inevitably takes place on the respective vehicle driving in front, either because the latter brakes sharply, independently and unexpectedly for the following vehicle or because the latter collides with the vehicle driving in front of the vehicle driving in front and as a result is braked unexpectedly sharply for the following vehicle.

It is preferably provided that the steering angle requested by the vehicle-to-X information and/or the requested deceleration is/are confirmed if the latter is/are less than or equal to a steering angle and/or a deceleration requested by the sensor information and/or the driver inputs. In this case, additional information is present in the following vehicle, i.e. the sensor information or the driver inputs which can be regarded as a confirmation of the vehicle-to-X information. Insofar as the confirmation is effected by the driver inputs, it can be assumed that the driver has recognized the need to perform the intervention with the requested steering angle or the requested deceleration and the driver input represents a corresponding reaction. The vehicle-to-X information or the steering angle requested by the vehicle-to-X information or the requested deceleration for the intervention can thus be regarded as sufficiently reliable to perform the intervention.

It is furthermore preferred that the intervention is carried out with a minimum necessary steering angle for preventing the rear-end collision and/or a minimum necessary deceleration if the steering angle requested by the vehicle-to-X information and/or the requested deceleration is/are greater than the steering angle and/or the deceleration which is/are requested by the sensor information and/or the driver inputs. To determine the minimum necessary steering angle or the minimum necessary deceleration, the deceleration, for example, of the vehicle driving in front of the vehicle driving in front contained in the vehicle-to-X information and the available distance to the vehicle driving in front can be used, wherein it is assumed that the vehicle driving in front will adopt the deceleration of the vehicle driving in front of the vehicle driving in front. A rear-end collision can thus be prevented even without confirmation by the sensor information or by the driver inputs, wherein an excessively abrupt deceleration is simultaneously prevented, since the deceleration is performed only with the minimum required intensity.

It is particularly preferred that the intervention is initially performed only with the minimum necessary steering angle or the minimum necessary deceleration and is increased to the full requested steering angle or the full requested deceleration as soon as the latter is confirmed.

In particular, it is preferred that the intervention is performed with a minimum necessary steering angle for preventing the rear-end collision and/or a minimum necessary deceleration only if the sensor information and/or the driver inputs actually request an intervention. This offers the further advantage that a partial confirmation is effected via the sensor information or the driver inputs insofar as an intervention with a still unconfirmed steering angle or a still unconfirmed deceleration is in principle required. This increases the safety of the method according to the invention.

It is appropriately provided that the intervention is performed at least with a steering angle requested by the sensor information and/or the driver inputs and/or a deceleration requested by the sensor information and/or the driver inputs. This offers the advantage that in this case at least an intervention is effected with a steering angle or a deceleration that is less than the steering angle requested by the vehicle-to-X information or the requested deceleration, but already has a specific steering angle or a specific deceleration and therefore produces a specific effect, the intensity of which can subsequently be increased if necessary. The sensor information is sufficiently reliable to perform an intervention with the steering angle requested by the sensor information or the requested deceleration. Since the driver inputs represent direct driver requests, these must also be met at all times.

In particular, it is provided that the intervention is performed with the steering angle requested by the sensor information and/or the requested deceleration if the latter is/are greater than the steering angle and/or the deceleration requested by the driver inputs. This offers the advantage that the steering angle or the deceleration of the intervention is not limited to the steering angle requested by the vehicle-to-X information or by the driver inputs or the requested deceleration if the sensor information requests a greater steering angle or greater deceleration. This may be the case, for example, if the vehicle driving directly in front decelerates more abruptly than the vehicle driving in front of the vehicle driving in front and the driver of the following vehicle reacts too hesitantly. A rear-end collision can thus be prevented in this situation also.

Similarly, it is provided, in particular, that the intervention is performed with the steering angle requested by the driver inputs and/or the requested deceleration if the latter is/are greater than the steering angle and/or the deceleration which is/are requested by the sensor information. It is thus ensured that driver requests can be fully implemented at all times, independently from the vehicle-to-X information and the sensor information.

It is furthermore provided that no intervention is performed if only the vehicle-to-X information requests the intervention. This offers the advantage that no unconfirmed interventions are performed which are founded exclusively on a comparatively unreliable basis such as the vehicle-to-X information. Incorrect or even maliciously falsified vehicle to-X information can thus be prevented from resulting in an intervention in the vehicle control.

In particular, it is provided that a visual, audible and/or haptic warning is/are output to the driver if only the vehicle-to-X information requests the intervention. It is thus ensured that the driver is at least alerted to the fact that a situation may exist which requires an intervention in the vehicle control at short notice. The driver can then, for example, increase his alertness and check the situation.

It is preferred that the behavior of the vehicle driving in front describes a deceleration of the vehicle driving in front and the behavior of the vehicle driving in front of the vehicle driving in front describes a deceleration of the vehicle driving in front of the vehicle driving in front. Unforeseen and sudden decelerations of vehicles driving in front of a following vehicle represent one of the most frequent causes of rear-end collisions for the following vehicles. Since the behavior describes a deceleration, this cause of accidents can advantageously be reduced.

It is furthermore advantageous for the vehicle-to-X information to be transmitted and detected by means of at least one of the following connection types:
- WLAN connection, in particular according to IEEE 802.11p,
- Wi-Fi Direct,
- ISM connection (Industrial, Scientific, Medical Band), in particular via a radio-link-enabled locking device,
- Bluetooth connection,
- ZigBee connection,
- UWB connection (Ultra Wide Band),
- WiMax connection (Worldwide Interoperability for Microwave Access),
- remote keyless entry connection,
- radio-link-enabled locking device,
- mobile connection, in particular GSM, GPRS, EDGE, UMTS and/or LTE connections, and
- infrared connection.

These connection types offer different advantages, depending on the type, wavelength and data protocol that is used. Some of the specified connection types thus enable e.g. a comparatively high data transmission rate and a comparatively fast connection set-up, whereas others are largely very well suited to data transmission around visibility obstructions. The combination and simultaneous or parallel use of a plurality of these connection types offer further advantages, since disadvantages of individual connection types are thus also cancelled out.

An aspect of the invention furthermore relates to a system for preventing a following vehicle from driving up on a vehicle driving directly in front, comprising the following vehicle with environment sensors, vehicle-to-X communication means, steering intervention means, braking intervention means and driver input means, furthermore comprising the vehicle driving in front and at least one vehicle driving in front of the vehicle driving in front, wherein the following vehicle detects a behavior of the vehicle driving directly in front by means of sensor information and a behavior of at least one vehicle driving in front of the vehicle driving in front by means of vehicle-to-X information, wherein the vehicle-to-X information requests an intervention in the steering means of the following vehicle in the form of a steering angle to be set and/or an intervention in the braking means of the following vehicle in the form of a deceleration to be set in order to prevent the rear-end collision and wherein the steering angle requested by the vehicle-to-X information and/or the requested deceleration is/are greater than a steering angle requested by the sensor information and/or driver inputs and/or a requested deceleration. The system is characterized in that the steering intervention means and/or the braking intervention means perform the intervention with the steering angle requested by the vehicle-to-X information and/or the requested deceleration only if the steering angle and/or the deceleration is/are confirmed by the sensor information and/or by the driver inputs. This offers the advantages already described.

It is preferably provided that the environment sensors comprise one or more sensors of the following group:
- lidar sensor,
- radar sensor,
- camera sensor, and
- ultrasound sensor.

The aforementioned sensors are comparatively well suited to environment detection in the motor vehicle industry and are furthermore technically already very mature. Furthermore, since an increasing number of new vehicles are already equipped as standard with one or more of these sensors, no additional equipment costs are incurred in this case.

It is furthermore provided that the system carries out the method according to the invention.

Finally, an aspect of the invention relates to a use of the system according to the invention in a motor vehicle.

BRIEF DESCRIPTION OF THE DRAWINGS

Further preferred embodiments can be found in this subclaims and the following description of an example embodiment with reference to figures.

In the figures:

FIG. 2 shows a traffic situation in which the method according to the invention is used.

DETAILED DESCRIPTION OF THE PREFERRED EMBODIMENTS

Figure 1:
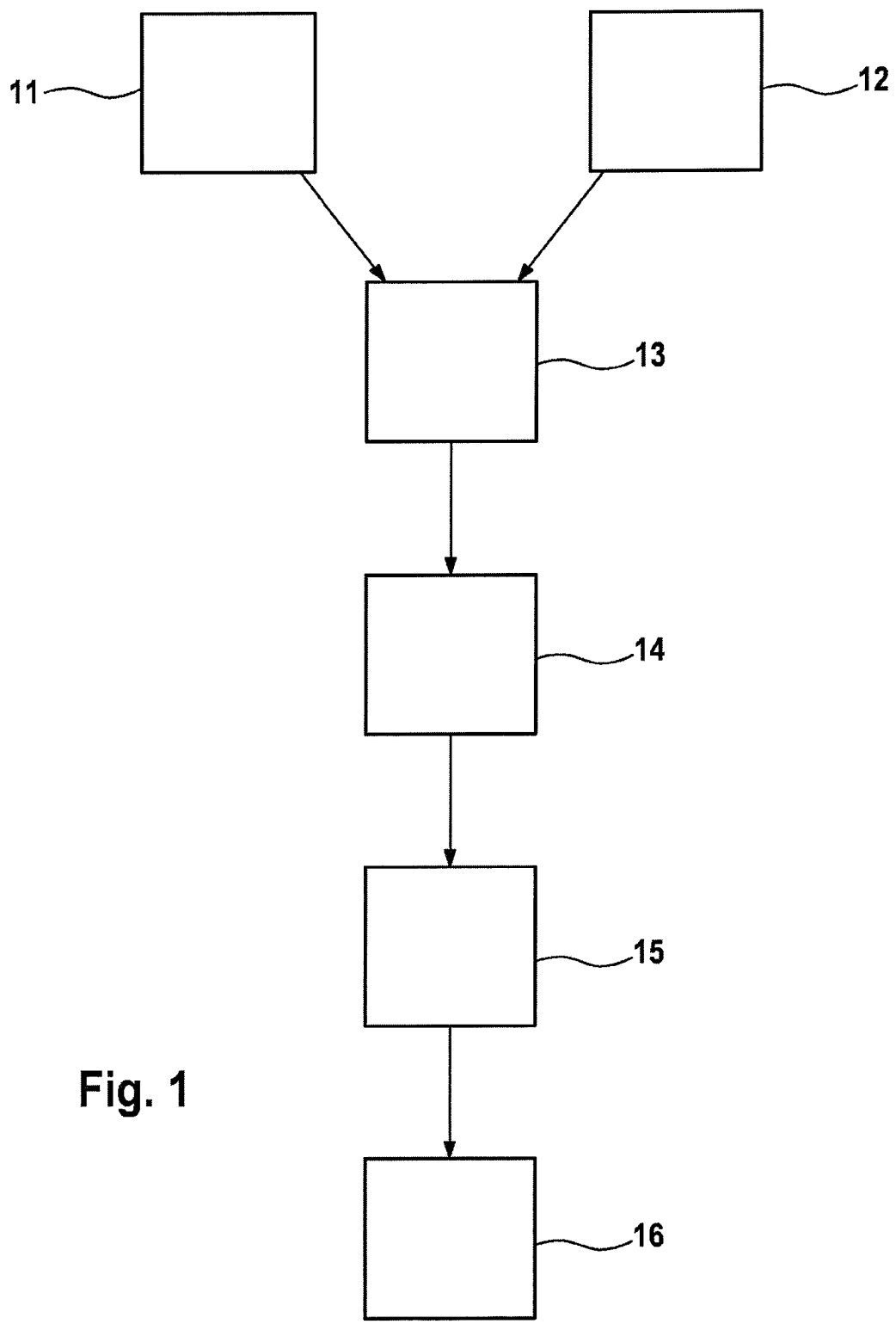
FIG. 1 shows a flow diagram representing the individual sequence steps of a possible embodiment of the method according to the invention.

FIG. 1 shows a flow diagram of a possible sequence of the method according to the invention. In step 11, a following vehicle driving behind a vehicle driving in front detects sensor information relating to an intervening deceleration process of the vehicle driving in front. Simultaneously, in step 12, the following vehicle detects vehicle-to-X information relating to a similarly intervening deceleration process of a vehicle driving in front of the vehicle driving in front, wherein the vehicle driving in front of the vehicle driving in front is not detectable by the sensors of the following vehicle, since it is hidden by the vehicle driving in front. Both the detected vehicle-to-X information and the detected sensor information in each case request an intervention in the braking means of the following vehicle in order to prevent a rear-end collision with the vehicle driving in front. The deceleration requested by the vehicle-to-X information is greater than the deceleration requested by the sensor information, since the vehicle driving in front of the vehicle driving in front is braking more sharply than the vehicle driving directly in front. The vehicle-to-X information cannot thus be confirmed by the sensor information. In step 13, the following vehicle therefore initially performs only a deceleration process with the deceleration requested by the sensor information. Finally, in step 14, the vehicle driving in front increases the intensity of its deceleration and adapts it to the vehicle driving in front of the vehicle driving in front. This is detected in step 15 by the following vehicle by means of new sensor information, whereupon, in step 16, the deceleration requested by the vehicle-to-X information is confirmed and the deceleration of the following vehicle is increased to the extent that it then corresponds to the deceleration requested by the vehicle-to-X information.

FIG. 2 shows schematically a traffic situation in which the method according to the invention is used. Vehicles 21, 22 and 23 are driving in convoy formation on the road 24. The vehicle 22 is the vehicle driving in front of the following vehicle 23, the vehicle 21 is the vehicle driving in front of the vehicle 22 driving in front. The vehicle 21 then begins a sudden deceleration process, which the driver of the vehicle 22 perceives and then similarly initiates a deceleration process which, however, is initially less abrupt than the deceleration process of the vehicle 21. Simultaneously with the initiation of the deceleration process, the vehicle 21 transmits vehicle-to-X information describing the deceleration, which is detected by the vehicle 23. A detection of sensor data describing the deceleration of the vehicle 21 is not possible for the vehicle 23, since the vehicle 21, from the perspective of the vehicle 23, is hidden by the vehicle 22. The deceleration requested by the vehicle-to-X information cannot therefore be initially confirmed. The vehicle 23 then begins a deceleration process with a deceleration requested by the sensor information, i.e. with a deceleration corresponding to the deceleration of the vehicle 22. The driver of the vehicle 23 is simultaneously made aware by means of a visual display in the instrument cluster and an audible warning tone that the vehicle 21 driving in front of the vehicle 22 driving in front is performing a deceleration process with a greater deceleration than the vehicle 22 driving directly in front. The driver of the vehicle 23 then recognizes that the vehicle 21 is actually decelerating more abruptly than the vehicle 22 and that both the vehicle 22 and the vehicle 23 are quickly approaching the vehicle 21. It then increases the deceleration of the vehicle 23 by means of a driver input via the driver input means, i.e. in this case an actuation of the brake pedal in such a way that the deceleration of the vehicle 23 essentially corresponds to the deceleration of the vehicle 21.

The invention claimed is:

1. A method for preventing a following vehicle from driving up on a first vehicle driving directly in front of the following vehicle, the method comprising:
   detecting, by the following vehicle, a behavior of the first vehicle driving directly in front of the following vehicle by first sensor information indicating a first intervention of at least one of a first steering angle to be set and a first deceleration to be set;
   detecting, by the following vehicle, a behavior of at least a second vehicle driving in front of the first vehicle by vehicle-to-X information indicating a second intervention of at least one of a second steering angle to be set and a second deceleration to be set, wherein the second steering angle is greater than the first steering angle, and the second deceleration is greater than the first deceleration;
   sequentially:
      executing, by the following vehicle, the first intervention when the second intervention is not confirmed, by at least one of:
         a) controlling the steering of the following vehicle to be the first steering angle, or
         b) controlling the deceleration of the following vehicle to be the first deceleration;
      confirming, by the following vehicle, the second intervention, in response to detecting driver input by a driver of the following vehicle; and
      in response to the second intervention being confirmed, executing, by the following vehicle, the second intervention by at least one of:
         a) controlling the steering of the following vehicle to be the second steering angle, or
         b) controlling the deceleration of the following vehicle to be the second deceleration in order to prevent a rear-end collision with the first vehicle.

2. The method as claimed in claim 1,
   wherein the steering angle requested by the vehicle-to-X information is confirmed if the steering angle requested by the vehicle-to-x information is less than or equal to a steering angle requested by the sensor information or the driver inputs, or the requested deceleration is confirmed if it is less than or equal to a deceleration requested by the sensor information or the driver inputs.

3. The method as claimed in claim 2,
   wherein the intervention is carried out with a minimum necessary steering angle for preventing the rear-end collision if the steering angle requested by the vehicle-to-X information is greater than the steering angle requested by the sensor information or the driver inputs, or
   wherein the intervention is carried out with a minimum necessary deceleration if the requested deceleration is greater than the deceleration which is requested by the sensor information or the driver inputs.

4. The method as claimed in claim 1,
   wherein the intervention is carried out with a minimum necessary steering angle for preventing the rear-end collision or a minimum necessary deceleration if the steering angle requested by the vehicle-to-X information is greater than the steering angle requested by the sensor information or the driver inputs, or the requested deceleration is greater than the deceleration requested by the sensor information or the driver inputs.

5. The method as claimed in claim 4,
   wherein the intervention is performed with the minimum necessary steering angle to prevent the rear-end collision only if the sensor information or the driver inputs actually request an intervention, or
   wherein the intervention is performed with the minimum necessary deceleration to prevent the rear-end collision only if the sensor information or the driver inputs actually request an intervention.

6. The method as claimed in claim 1,
   wherein the intervention is performed at least with the steering angle requested by the sensor information or the driver inputs, or wherein the intervention is performed at least with the deceleration requested by the sensor information or the driver inputs.

7. The method as claimed in claim 6,
wherein the intervention is performed with the steering angle requested by the sensor information if the steering angle requested by the sensor information is greater than the steering angle requested by the driver inputs, or
wherein the intervention is performed with the requested deceleration if the requested deceleration is greater than the deceleration which is requested by the driver inputs.

8. The method as claimed in claim 6,
wherein the intervention is performed with the steering angle requested by the driver inputs if the steering angle requested by the driver inputs is greater than the steering requested by the sensor information, or
wherein the intervention is performed with the requested deceleration if the requested deceleration is greater than the deceleration which is requested by the sensor information.

9. The method as claimed in claim 1,
wherein no intervention is performed if only the vehicle-to-X information requests the intervention.

10. The method as claimed in at least claim 9,
wherein at least one of a visual, audible or haptic warning is output to the driver if only the vehicle-to-X information requests the intervention.

11. The method as claimed in claim 1,
wherein the behavior of the first vehicle describes a deceleration of the first vehicle and the behavior of the at least a second vehicle describes a deceleration of the at least a second vehicle.

12. A system for preventing a following vehicle from driving up on a first vehicle driving directly in front of the following vehicle, the method comprising:
   environment sensors for detecting by the following vehicle a behavior of the first vehicle driving directly in front of the following vehicle by detecting first sensor information indicating a first intervention of at least one of a first steering angle to be set and a first deceleration to be set;
   a vehicle-to-X communication means for detecting by the following vehicle a behavior of at least one second vehicle driving in front of the first vehicle by receiving vehicle-to-X information indicating a second intervention of at least one of a second steering angle to be set and a second deceleration to be set, wherein the second steering angle is greater than the first steering angle, and the second deceleration is greater than the first deceleration;
   a processor configured to sequentially:
      execute the first intervention when the second intervention is not confirmed, by at least one of:
         a) controlling the steering of the following vehicle to be the first steering angle, or
         b) controlling the deceleration of the following vehicle to be the first deceleration;
      confirm the second intervention in response to detecting driver input by a driver of the following vehicle; and
      in response to the second intervention being confirmed, execute the second intervention by at least one of:
         a) controlling the steering of the following vehicle to be the second steering angle, or
         b) controlling the deceleration of the following vehicle to be the second deceleration in order to prevent a rear-end collision with the first vehicle.

13. The system as claimed in claim 12,
wherein the environment sensors comprise one or more sensors of the following group:
   a lidar sensor,
   a radar sensor,
   a camera sensor, and
   an ultrasound sensor.

14. The system as claimed in claim 12,
wherein the system carries out a method for preventing a following vehicle from driving up on a vehicle driving directly in front, in which the following vehicle detects a behavior of the vehicle driving directly in front by sensor information and a behavior of at least one vehicle driving in front of the vehicle driving in front by means of vehicle-to-X information,
wherein the vehicle-to-X information requests an intervention in steering means of the following vehicle in the form of a steering angle to be set to prevent the rear-end collision with the vehicle, or requests an intervention in braking means of the following vehicle in the form of a deceleration to be set in order to prevent the rear-end collision with the vehicle,
wherein the steering angle requested by the vehicle-to-X information is greater than a steering angle requested by the sensor information or driver inputs, or the requested deceleration is greater than a requested deceleration,
wherein the intervention with the steering angle requested by the vehicle-to-X information is performed only if this steering angle is confirmed by the driver inputs, and
wherein the intervention with the requested deceleration is performed only if this deceleration is confirmed by the driver inputs.

15. A motor vehicle comprising the system as claimed in claim 12.

* * * * *